(12) United States Patent
Schuster

(10) Patent No.: US 6,498,662 B1
(45) Date of Patent: Dec. 24, 2002

(54) APPARATUS AND METHOD FOR RECEIVING OPTICAL TELECOMMUNICATION TRANSMISSIONS BY USING A HOLOGRAPHIC OPTICAL ELEMENT

(75) Inventor: John J. Schuster, Bellevue, WA (US)

(73) Assignee: Terabeam Corporation, Kirkland, WA (US)

( * ) Notice: Subject to any disclaimer, the term of this patent is extended or adjusted under 35 U.S.C. 154(b) by 167 days.

(21) Appl. No.: 09/627,276

(22) Filed: Jul. 28, 2000

(51) Int. Cl.[7] ................................................ G02B 5/32
(52) U.S. Cl. ............................ 359/15; 359/13; 359/34; 385/13; 385/34; 385/14
(58) Field of Search ............................... 359/15, 34, 13; 385/13, 14, 27

(56) References Cited

U.S. PATENT DOCUMENTS 5,638,469 A * 6/1997 Feldman et al. .............. 385/14
6,278,534 B1 * 8/2001 Arns .............................. 359/15

* cited by examiner

Primary Examiner—Cassandra Spyrou
Assistant Examiner—Craig Curtis
(74) Attorney, Agent, or Firm—Blakely Sokoloff Taylor & Zafman

(57) ABSTRACT

A holographic optical element (HOE) device useable for an optical receiver system has a first element having first and second surfaces, with the first surface being positionable to face incident light rays. The incident light rays can comprise laser light having data modulated thereon. An emulsion material is disposed over the second surface of the first element and has a recorded interference pattern that diffracts the incident light rays that pass through the first element. A second element overlies the emulsion material and is structured to pass resulting light rays derived from the incident light rays and diffracted from the recorded interference pattern. A plurality of reflective elements are positioned adjacent to the first and second elements. The reflective elements fold the resulting light rays within the second element, thereby allowing a reduction in separation length between the emulsion material and receiver electronics.

44 Claims, 1 Drawing Sheet

APPARATUS AND METHOD FOR RECEIVING OPTICAL TELECOMMUNICATION TRANSMISSIONS BY USING A HOLOGRAPHIC OPTICAL ELEMENT

BACKGROUND OF THE INVENTION

1. Field of the Invention

The present invention relates generally to wireless telecommunication systems, and in particular relates to the use of a holographic optical element (HOE) device in an optical wireless telecommunication system receiver, with the HOE device having a substantially solid form.

2. Background Information

With the increasing popularity of wide area networks, such as the Internet and/or World Wide Web, network growth and traffic have exploded in recent years. Network users continue to demand faster networks, and as network demands continue to increase, existing network infrastructures and technologies are reaching their limits.

An alternative to existing hardwire or fiber network solutions is the use of wireless optical telecommunications technology. Wireless optical telecommunications utilize beams of light as optical communications signals, and therefore do not require the routing of cables or fibers between locations. Data or information is encoded into a beam of light, and then transmitted through free space from a transmitter to a receiver.

A hindrance in the widespread acceptance and use of wireless optical telecommunications systems is the complicated, bulky, and obtrusive equipment required for reception of the optical communications signals. Most receivers used in wireless optical communications systems utilize light collection devices. These light collection devices can be simple telescopes (such as a telescope having a Schmidt configuration), or they can be more complex variations on the telescope theme. The shared element between all of these systems is that the receivers must incorporate a separation length between the light collection elements and the receive components due to the physical focal length requirements of the receiver, even when the light path is shortened using folding techniques. This separation length is typically free space, which results in a bulky and fragile receiver.

Accordingly, improvements in receivers for wireless optical telecommunication systems are needed.

SUMMARY OF THE INVENTION

According to an aspect of the invention, an apparatus has a first element having first and second surfaces, with the first surface being positionable to face incident light rays. An emulsion material is disposed over the second surface of the first element and has an interference pattern recorded thereon. A second element overlies the emulsion material and is structured to pass resulting light rays derived from the incident light rays and diffracted from the recorded interference pattern. A plurality of reflective elements are positioned adjacent to the first and second elements to fold the resulting light rays within the second element.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Figure 1:
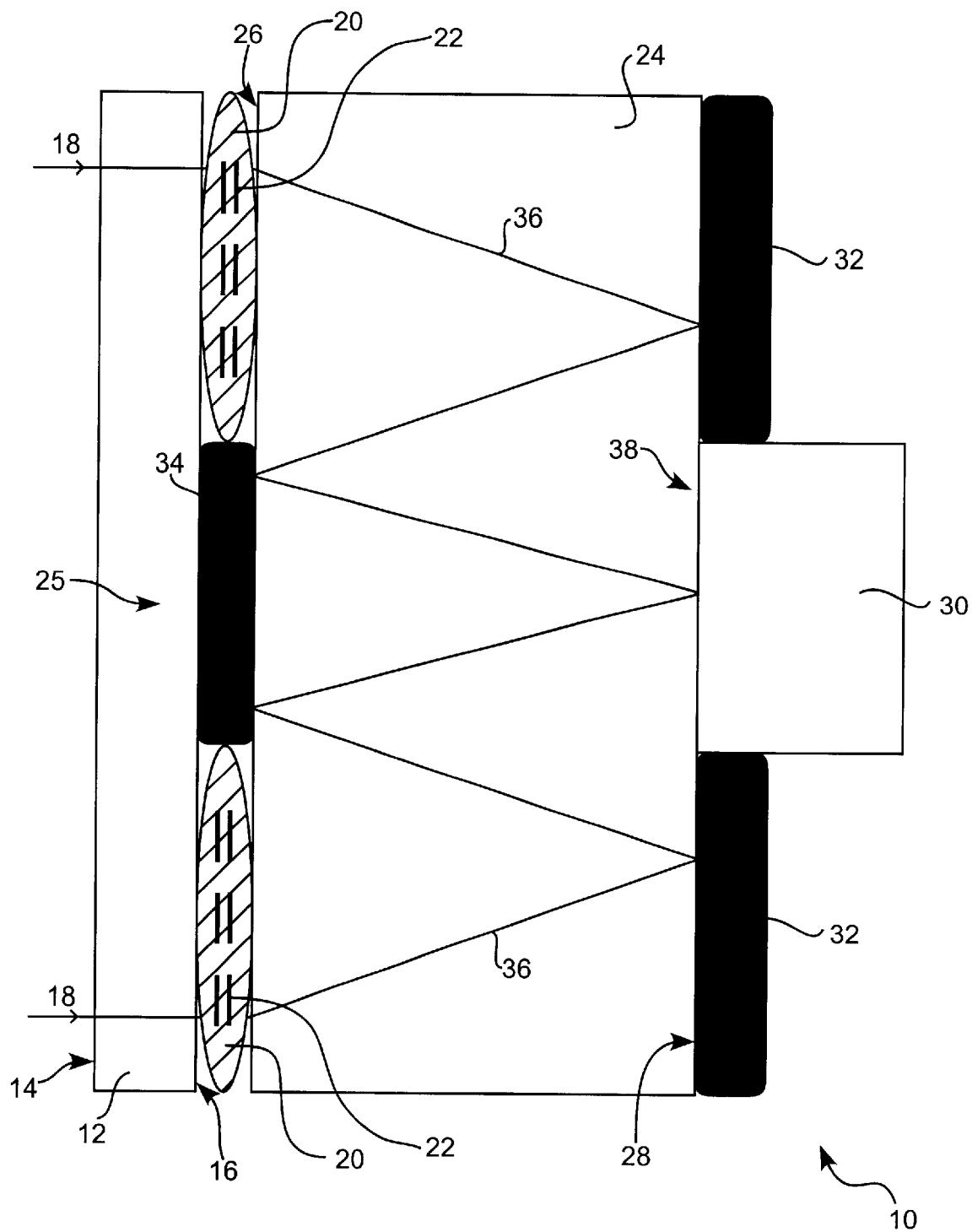
FIG. 1 is a side sectional view of an embodiment of a HOE device that can be used in an optical receiver system.

Embodiments of an apparatus and method for receiving optical telecommunications transmissions by using a holographic optical element (HOE) device, with the HOE device having a substantially solid form, are described in detail herein. In the following description, some specific details are provided to provide a thorough understanding of embodiments of the invention. One skilled in the relevant art will recognize, however, that the invention can be practiced without one or more of the specific details, or with other methods, materials, components, etc. In other instances, well-known structures, materials or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Referring first to FIG. 1, shown generally at 10 is an embodiment of a HOE device that can be used in an optical telecommunication receiver system. The HOE device 10 includes a first element 12 having a first surface 14 and a second surface 16. The first surface 14 is positionable to face incident light rays 18 sent from a transmitter system (not shown). The incident light rays 18 can comprise laser light and the like, having a wavelength of 1548.51 nm, for example in one embodiment, and having data modulated thereon. The incident light rays 18 are not limited to being monochromatic or to any particular wavelength or color, and may include visible light as well as ultraviolet or infrared portions of the spectrum.

Disposed on the second surface 16 of the first element 12 is an emulsion material 20. The emulsion material 20 has recorded thereon/therein an interface pattern 22, which in one embodiment, comprises a volume phase hologram that diffracts the incident light rays 18 that pass through the first element 12. Embodiments of methods to record the interference pattern 22 are described in detail in "SYSTEM AND METHOD FOR USING A HOLOGRAPHIC OPTICAL ELEMENT IN A WIRELESS TELECOMMUNICATION SYSTEM RECEIVER," U.S. application Ser. No. 09/627,815, filed Jul. 28, 2000, and in "APPARATUS AND METHOD FOR CORRECTING ABERRATIONS IN PHOTON COLLECTION DEVICES," U.S. application Ser. No. 09/627,816, filed Jul. 28, 2000, both currently pending, assigned to the same assignee as the present application, and incorporated herein by reference.

According to an embodiment of the invention, the emulsion material 20 can have a substantially annular configuration, such that there is an opening 25 at its central region. In other embodiments, the opening 25 can be located at other regions of the emulsion material 20 (e.g., the emulsion material 20 can have a non-annular shape), or the emulsion material 20 may not have any opening(s) 25. In one embodiment, the HOE device 10 uses a dichromated gelatin for the emulsion material 20, though photopolymers providing a high level of diffraction efficiency for specific wavelengths or for intended purposes may also be used. A suitable type of gelatin, which can be mixed with dichromate according to ratios known by those skilled in the art, is designed by Ralcon Development Lab, located at Paradise City, Utah, and manufactured by Kind & Knox Gelatine, Inc., under their Gelita™ line of optical gelatins, Type 7644, Lot 2. In another embodiment, the emulsion material 20 may be made from a homogenized mixture of silver halides, such as those mixtures that are commercially available for optical applications.

The HOE device 10 includes a second element 24 having a first surface 26 disposed over the emulsion material 20 and a second surface 28. In this manner, the first element 12 and the second element 24 "sandwich" the emulsion material 20, thereby providing a solid platform for the emulsion material 20. The second element 24 acts as a protective cover for the emulsion material 20 to protect the emulsion material 20 from environmental elements such as moisture, dust, etc. In one embodiment, an adhesive can be applied that is index-matched with the second element 24, to affix the second element 24 to the emulsion material 20.

More significantly, the second element 24 replaces the free space between emulsion material 20 and receiver electronics 30 with a solid body. That is, an extremely robust HOE device 10 results because the second element 24 provides a solid body that substantially occupies the separation length between the emulsion material 20 on the first surface 26 and the receiver electronics 30 located adjacent to the second surface 28.

The HOE device 10 further includes a reflective element (or surface) 32 positioned on/adjacent to the second surface 28. In one embodiment, the reflective element 32 can have an annular shape that surrounds the receiver electronics 30. The HOE device 10 also includes another reflective element (or surface) 34, which in one embodiment is located in the center of the emulsion material 20 (e.g., within the opening 25 in the emulsion material 20). In another embodiment, the reflective element 34 may be located on/adjacent to the first surface 14 of the first element 12, instead of being located on the second surface 16 adjacent to the emulsion material 20. The reflective elements 32 and 34 can be vapor-deposited reflective metal, a thin mirror film glued to the surface(s), or other similar material/components.

In one embodiment, the HOE device 10 can have a substantially cylindrical shape, although it is to be appreciated that other shapes (e.g., elliptical or square) may be implemented. If a cylindrical shape is used, the first element 12 and second element 24 can have a diameter between 6 and 8 inches, for example, in one embodiment, while another embodiment might have a diameter of 16 inches. The first element 12 can have a thickness between 0.125 and 0.25 inches, while the second element 24 can have a thickness between 2 and 2.5 inches, for example, in one embodiment. In other embodiments, these thicknesses may be different, depending on the particular design or application being used. The emulsion material 20 can have a thickness of 0.030 mm, while an adhesive material may have a thickness of 0.1 mm, for example. A person skilled in the art will recognize that these dimensions may vary or may be scaled based on various criteria and optical factors, such as type of material used, type of application, coefficient of thermal expansion, index of refractions, index of dispersion, etc. It is to be appreciated that the invention is not necessarily limited by specific physical dimensions or by specific physical or optical properties of the components in the HOE device 10.

According to one embodiment, the first element 12 and the second element 24 comprise glass elements having flat surfaces, although other types of materials, such as molded plastic, may be used in other embodiments. An illustrative HOE device 10 may use standard BK-7 glass for the first element 12 and for the second element 24, with the BK-7 glass having known physical and optical properties. The materials used for the first element 12 and for the second element 24 can have an index of refraction in the range of 1.54851±1, for example. Surfaces of the first element 12 and the second element 24 are typically made as smooth as possible, to prevent these elements from introducing unacceptable aberrations into the incident light rays 18, or into resulting rays 36 diffracted from the interface pattern 22. Additionally, the material making up the first element 12 and the second element 24 should be as transmissive as possible, so that the power of the incident light rays 18 is not scattered and/or minimize diffractive effects of the first element 12 and the second element 24.

In operation, the incident light rays 18 enter the HOE device 10 through the first element 12, and pass through the first element 12 to the interference pattern 22. The incident light rays 18 are then diffracted by the interference pattern 22, which in one embodiment is along an annular configuration of the emulsion material 20, thereby obtaining the resulting light rays 36.

The resulting light rays 36 proceed along their path(s) through the second element 24 until they reach the reflective element 32 at the second surface 28. The reflective element 32 folds or reflects the resulting light rays 36 back through the second element 24, towards the reflective element 34 located adjacent to the first element 12. The reflective element 34 then reflects or directs the resulting light rays through an opening 38 of the reflective element 38 for reception by the receiver electronics 30.

The receiver electronics 30 includes various optical processing component(s), such as photodetectors (e.g., an avalanche photodiode), demodulators, tracking circuitry, processors, etc. to process the received resulting light rays 36 and to obtain electronic data therefrom.

In conclusion, an embodiment of the invention eliminates free space in the HOE device 10. The HOE device 10 can be used as part of an optical receiver system that is extremely rugged and durable. An embodiment provides these advantages by replacing the free space through which light travels with a solid material. Furthermore, the separation length between the emulsion material 20 and the receiver electronics 30 can be significantly reduced by using reflective elements 32 and 34 to fold light paths within the solid, clear second element 24.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, although embodiments are described herein as positioning the reflective elements 32 and 34 on the surfaces of the first element 12 and the second element 24, it is possible to provide other embodiments where these reflective elements are embedded within the material of the first element 12 and/or second element 24. In such embodiments, the reflective elements 32 or 34 can be present in the mold for the first element 12 and second element 24 during the manufacturing process, when liquefied material is poured. In another embodiment, the second element 24 can comprise a plurality of layers, rather than a single solid object, with the reflective element 32 sandwiched between two layers. Similar modifications can be made to the first element 12 as well.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a first element having first and second surfaces, the first surface being positionable to face incident light rays;
   an emulsion material disposed over the second surface of the first element and having an interference pattern recorded thereon;
   a second element including a first surface overlying the emulsion material and a second surface, and structured to pass resulting light rays derived from the incident light rays and diffracted from the recorded interference pattern; and
   a plurality of reflective elements positioned adjacent to the first and second surfaces of the second element to fold the resulting light rays within the second element.

2. The apparatus of claim 1 wherein the plurality of reflective elements include:
   a first reflective element disposed adjacent to the first surface of the second element; and
   a second reflective element disposed adjacent to the second surface of the second element.

3. The apparatus of claim 1 wherein the emulsion material has a substantially annular configuration and wherein the plurality of reflective elements include a reflective element disposed in a central region of the annular configuration.

4. The apparatus of claim 1 wherein the second element has a surface overlying the emulsion material and has a second surface and wherein the plurality of reflective elements include a reflective element having a substantially annular configuration disposed adjacent to the second surface of the second element.

5. The apparatus of claim 1, further comprising receiver electronics positioned adjacent to the second element to receive the resulting light rays.

6. The apparatus of claim 1 wherein the first and second elements are made from a glass or molded plastic material.

7. The apparatus of claim 1 wherein the emulsion material is made from a dichromated gelatin material.

8. The apparatus of claim 1, further comprising an adhesive material index-matched with the second element to bond the second element to the emulsion material.

9. The apparatus of claim 1 wherein the reflective elements include a reflective element disposed within the second element.

10. The apparatus of claim 2 wherein the interference pattern is capable of diffracting the incident light rays as first resulting light rays through the second element to the second reflective element, the second reflective element being capable of reflecting the first resulting light rays through the second element towards the first reflective element as second resulting light rays, the first reflective element being capable of reflecting the second resulting light rays through the second element towards a receiver component as third resulting light rays.

11. The apparatus of claim 4, further comprising receiver electronics positioned in a central region of the annular configuration to receive the resulting light rays.

12. An apparatus, comprising:
    first element having first and second surfaces, the first surface being positionable to face incident light rays;
    an emulsion material disposed over the second surface of the first element and having an aperture therein and an interference pattern recorded thereon;
    a second element including a first surface overlying the emulsion material and includes a second surface, the second element being structured to pass resulting light rays derived from the incident light rays and diffracted from the recorded interference pattern, the second element being sized to substantially occupy a separation length between the emulsion material and a receiver component;
    a first reflective element substantially aligned with the aperture; and
    a second reflective element positioned adjacent to the second face of the second element.

13. The apparatus of claim 12 wherein the first reflective element is positioned within the first element.

14. The apparatus of claim 12 wherein the first reflective element is disposed adjacent to the first surface of the second element.

15. The apparatus of claim 12 wherein the emulsion material has a substantially annular configuration and wherein the first reflective element is disposed in a central region of the annular configuration.

16. The apparatus of claim 12 wherein the first reflective element is disposed adjacent to the first surface of the first element.

17. The apparatus of claim 12 wherein the second reflective element has a substantially annular configuration disposed on the second surface of the second element.

18. The apparatus of claim 12 wherein the first and second elements are made from a glass or molded plastic material.

19. The apparatus of claim 12 wherein at least one of the first and second reflective elements is disposed within the second element.

20. The apparatus of claim 14 wherein the interference pattern is capable of diffracting the incident light rays as first resulting light rays through the second element to the second reflective element, the second reflective element being capable of reflecting the first resulting light rays through the second element towards the first reflective element as second resulting light rays, the first reflective element being capable of reflecting the second resulting light rays through the second element towards the receiver component as third resulting light rays.

21. A method, comprising:
    receiving incident light rays;
    diffracting the incident light rays from an interference pattern as resulting light rays;
    passing the light rays through a solid material sized to substantially occupy a separation length between the interference pattern and an optical processing component; and
    folding the resulting light rays within the solid material by using reflective elements positioned adjacent to opposing surfaces of the solid material.

22. The method of claim 21 wherein the opposing surfaces comprise a first surface overlying the emulsion material and a second surface adjacent to the optical processing component, wherein the reflective elements comprise:

a first reflective element disposed adjacent to the first surface in a substantially central region of the emulsion material; and a second reflective element disposed in a substantially annular configuration adjacent to the second surface, the optical processing component being positioned in a central region of the annular configuration.

23. The method of claim 21, further comprising using the optical processing component to retrieve data modulated on the resulting light rays.

24. A method comprising:

recording an interference pattern on an emulsion material applied on a surface of a first element;

affixing a second element over the emulsion material, the second element being sized to substantially occupy a separation length between the emulsion material and a focal point of light rays diffracted from the interference pattern; and placing reflective elements adjacent to opposing surfaces of the second element to fold the light rays within the second element.

25. The method of claim 24, further comprising:

placing an assembly comprising the first element, emulsion material, and second element in an optical receiver system; and positioning an optical processing component at the focal point to detect the light rays.

26. The method of claim 24 wherein one of the reflective elements is placed within the second element.

27. The method of claim 24 wherein affixing the second element to the emulsion material comprises applying an adhesive material index-matched with the second element.

28. The method of claim 24 wherein the second element comprises a glass material.

29. The method of claim 24 wherein the emulsion material comprises a dichromated gelatin material.

30. A device manufactured according to the process of claim 24.

31. The method of claim 24 wherein the second element comprises a plastic material.

32. A method, comprising:

receiving incident light rays;

diffracting the incident light rays from an interference pattern as resulting light rays, the interference pattern having an aperture therein;

passing the resulting light rays through a solid material having a first surface adjacent to the interference pattern and a second surface, and sized to substantially occupy a separation length between the interference pattern and an optical processing component; and folding the resulting light rays within the solid material using a first reflective element substantially aligned with the aperture and a second reflective element positioned adjacent to the second surface of the solid material.

33. The method of claim 32 wherein the first reflective element is disposed adjacent to the first surface in a substantially central region of the emulsion material, and the second reflective element is disposed in a substantially annular configuration adjacent to the second surface, the optical processing component being positioned in a central region of the annular configuration.

34. The method of claim 32, further comprising using the optical processing component to retrieve data modulated on the resulting light rays.

35. A method comprising:

recording an interference pattern having an aperture therein on an emulsion material and being applied on a surface of a first element; and affixing a second element over the emulsion material, the second element being sized to substantially occupy a separation length between the emulsion material and a focal point of light rays diffracted from the interference pattern; and placing a first reflective element in substantial alignment with the aperture and a second reflective element adjacent to the second surface of the solid material to fold the light rays within the second element.

36. The method of claim 35, further comprising:

placing an assembly comprising the first element, emulsion material, and second element in an optical receiver system; and positioning an optical processing component at the focal point to detect the light rays.

37. The method of claim 35 wherein the first reflective element is placed on a surface of the first element opposite to the surface having the applied emulsion material.

38. The method of claim 35 wherein at least one of the first and second reflective elements is placed within the second element.

39. The method of claim 35 wherein the first reflective element is places within the first element.

40. The method of claim 35 wherein affixing the second element to the emulsion material comprises applying an adhesive material index-matched with the second element.

41. The method of claim 35 wherein the second element comprises a glass material.

42. The method of claim 35 wherein the emulsion material comprises a dichromated gelatin material.

43. A device manufactured according to the process of claim 35.

44. The method of claim 35 wherein the second element comprises a plastic material.

* * * * *